US011946785B2

(12) United States Patent
Fitzsimmons et al.

(10) Patent No.: US 11,946,785 B2
(45) Date of Patent: Apr. 2, 2024

(54) MATERIAL INDEPENDENT MASS FLOW SENSOR

(71) Applicant: Topcon Positioning Systems, Inc., Livermore, CA (US)

(72) Inventors: John P. Fitzsimmons, Johnson Creek, WI (US); David C. Eaton, Bar Harbor, ME (US)

(73) Assignee: Topcon Positioning Systems, Inc., Livermore, CA (US)

( * ) Notice: Subject to any disclaimer, the term of this patent is extended or adjusted under 35 U.S.C. 154(b) by 336 days.

(21) Appl. No.: 17/643,803

(22) Filed: Dec. 10, 2021

(65) Prior Publication Data

US 2022/0187110 A1 Jun. 16, 2022

Related U.S. Application Data

(60) Provisional application No. 63/124,690, filed on Dec. 11, 2020.

(51) Int. Cl.
*G01F 1/30* (2006.01)
*A01D 41/127* (2006.01)
*G01N 19/02* (2006.01)

(52) U.S. Cl.
CPC ........... *G01F 1/30* (2013.01); *A01D 41/1272* (2013.01); *G01N 19/02* (2013.01)

(58) Field of Classification Search
CPC ........ G01F 1/30; A01D 41/1272; G01N 19/02
See application file for complete search history.

(56) References Cited

U.S. PATENT DOCUMENTS

| 5,561,250 A | * | 10/1996 | Myers .................. G01F 13/003 73/861.73 |
| 5,686,671 A | | 11/1997 | Nelson et al. |
| 5,736,652 A | * | 4/1998 | Strubbe ..................... G01F 1/30 73/861.73 |
| 5,878,371 A | | 3/1999 | Hale et al. |

(Continued)

FOREIGN PATENT DOCUMENTS

| CA | 2359126 C | 8/2003 |
| EP | 0753720 A1 | 1/1997 |
| EP | 3278652 A1 | 2/2018 |

OTHER PUBLICATIONS

International Search Report and Written Opinion dated Sep. 28, 2022 in connection with International Patent Application No. PCT/US2021/072866, filed Dec. 10, 2021, 16 pgs.

*Primary Examiner* — Natalie Huls
*Assistant Examiner* — Sharad Timilsina
(74) *Attorney, Agent, or Firm* — Chiesa Shahinian & Giantomasi PC (57) ABSTRACT

A material independent mass flow sensor is used to generate signals that can be used to calculate mass flow of grain harvested by a combine. A method for determining a mass of material includes the steps of receiving data from a three-measurement transducer and determining an angular center of mass location of an object based on the data from the three-measurement transducer. A coefficient of friction of the object is determined. A velocity of the object is determined. A mass of the object is determined. The mass of the object can be determined based on the angular center of mass location of the object, the coefficient of friction of the object, and the velocity of the object.

20 Claims, 7 Drawing Sheets

(56) References Cited

U.S. PATENT DOCUMENTS

| | | |
|---|---|---|
| 5,902,343 A | 5/1999 | Hale et al. |
| 7,870,794 B2 | 1/2011 | Bickmann et al. |
| 9,903,979 B2 | 2/2018 | Dybro et al. |
| 10,420,278 B2 | 9/2019 | Koch et al. |
| 10,620,023 B2 | 4/2020 | Brandmeier et al. |
| 2002/0056325 A1 | 5/2002 | Soderholm et al. |
| 2010/0011881 A1 | 1/2010 | Bickmann et al. |
| 2011/0209925 A1 | 9/2011 | Rossi |
| 2018/0042177 A1* | 2/2018 | Baert ................. G01F 1/78 |

* cited by examiner

MATERIAL INDEPENDENT MASS FLOW SENSOR

FIELD OF THE INVENTION

The present disclosure relates generally to agricultural yield monitoring and, more particularly, to a material independent mass flow sensor for use in yield monitoring.

BACKGROUND

Combines used for harvesting grain from agricultural fields often have sensors for detecting various attributes of the harvested grain. Information regarding a mass of grain harvested is useful in determining the yield of grain harvested from a field. Yield can be determined using mass flow measurement of harvested grain. The determined yield can also be used to determine how crops in a particular area should be treated with agricultural materials to increase the yield from the particular area.

Traditional mass flow measurement in grain moving equipment uses methods and apparatus that are at best approximations. In the case of combines, grain flow is interrupted just beyond the clean grain elevator by an impact plate attached to a force measuring device. Impact of a portion of the grain generates a load-proportional electrical signal in the force measuring device and a subsequent digital message in an attached electronic computing device. The force measuring device is typically a unidirectional sensor detecting the impact force. Grain flow may also be interrupted by a guide curve (e.g., a curved plate). When a curved plate is used, grain is directed to move along the curved plate and a sensor detects forces (e.g., impact force and/or centripetal force) caused by the grain impacting and moving along the guide curve. Conversion from impact or centripetal force to mass flow uses laboriously created lookup tables and/or piecewise non-linear impact force curves which are dependent on many variables including, but not limited to, grain type, moisture content, temperature, grain speed, physical dimensions of the impact plate and the surrounding structure, etc. and are typically in constant need of verification and/or recalibration throughout the harvesting season. What is needed is a device that allows a user to easily obtain accurate yield measurements.

SUMMARY

The present disclosure pertains to a material independent mass flow sensor for calculating mass flow of grain harvested by a combine.

In one embodiment, for determining mass of an object moving through a material independent mass flow sensor (MIMFS) includes receiving data from a three-measurement transducer attached to a load curve as the object moves through the MIMFS. An angular center of mass location of the object along the load curve based on data from the three-measurement transducer is determined. In one embodiment, the angular center of mass location of the object is determined based on measurements of bend force $F_B$, stretch force $F_S$, torque T, load curve radius R, transducer attachment offset E and transducer attachment angular location with respect to machine level $\beta$. A coefficient of friction of the object is determined. In one embodiment, the coefficient of friction of the object is determined based on the angular center of mass location $\alpha$, $F_B$, $F_S$, and $\beta$. A velocity of the object is determined. In one embodiment, the velocity of the object is based on the angular center of mass location $\alpha$, the object's coefficient of friction $\mu$, the load curve radius R, the gravitational acceleration g, the angular location of the load curve entrance with respect to machine level $\delta$, and the initial velocity of the object as it enters the load curve at location $\delta$ is $v_0$. A mass of the object is determined. In one embodiment, the mass of the object is determined based on the angular center of mass location of the object, the coefficient of friction of the object, and the velocity of the object. In one embodiment, the mass of the object is further based on the load curve radius R, the transducer attachment angular location with respect to machine level $\beta$, gravitational acceleration g, an angular offset of machine level from true level $\theta$ and $F_B$. In one embodiment, a measurement time, specifically the time a mass is located on the load curve, is determined. In one embodiment, measurement time is determined based on the average velocity of the mass along the load curve. In one embodiment, measurement time is further based on the angular location of the load curve entrance with respect to machine level the angular location of the load curve exit with respect to machine level $\gamma$ and the load curve radius R. A mass flow is determined. In one embodiment, a mass flow is determined based on a mass of an object and a measurement time. An incremental mass is determined. In one embodiment, an incremental mass is determined based on a mass of an object, the three-measurement transducer's measurement sampling rate and the measurement time. A total mass is determined. In one embodiment, a total mass is determined by summing incremental masses over the duration of the process. A material independent mass flow sensor and a combine having a material independent mass flow sensor are also described.

DETAILED DESCRIPTION

Figure 1:
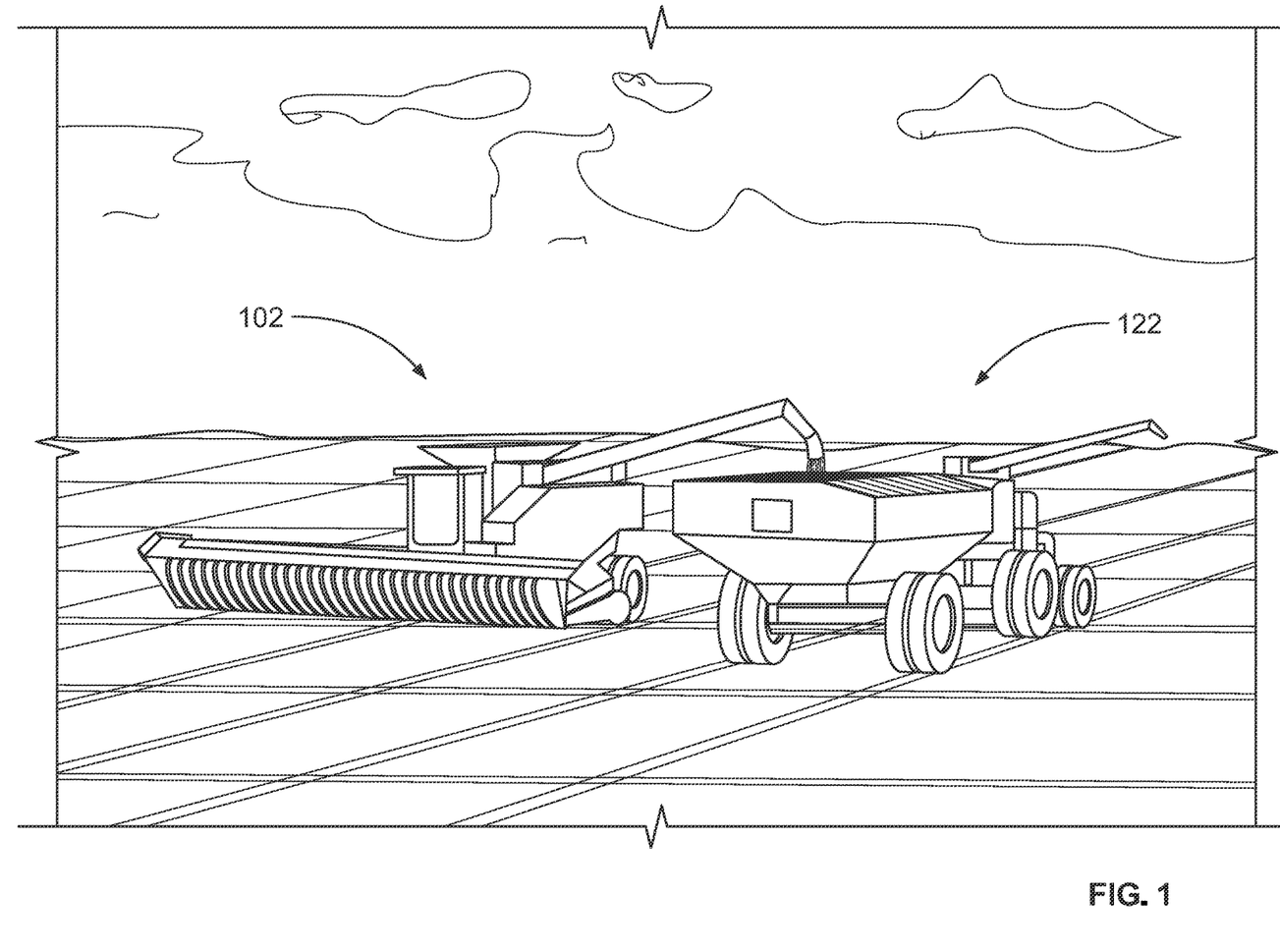
FIG. 1 shows a combine and grain cart operating in a field.

FIG. 1 shows combine 102 located in a field. Combine 102 is harvesting grain which is transferred to grain cart 122. In one embodiment, combine 102 is equipped with sensors for determining various attributes of the harvested grain. As combine 102 travels in a field, it harvests material, such as grain, that has been grown in the field. The harvested grain travels through conduits located in combine 102 and interacts with a mass flow sensor. The mass flow sensor determines the mass of material, such as grain, flowing in the conduit in which the mass flow sensor is located. Data from the mass flow sensor and data from grain cart 122 can be used to determine the yield produced by different areas of the field that is being harvested. The yield information can then be used to modify planting and treatment of different areas of the field.

Mass flow meters require frequent calibration. One reason why this calibration is required is due to the different properties of different materials (e.g., the amount of friction that occurs when a material travels along the curved impact plate varies with material) that are harvested and the masses of those materials as measured by the mass flow sensor. Improvements to mass flow measurements can be made by connecting a force measuring device, as described herein, to a curved load plate. In one embodiment, a mass flow sensor utilizes a three-measurement transducer that allows the forces caused by material interacting with the curved impact plate of the mass flow sensor to be sensed. This sensing of three parameters by the three-measurement transducer allows some variables, such as friction, to be eliminated from equations used to calculate the mass of material traveling through the mass flow sensor. Data from such a mass flow sensor can be used to determine the mass flow of material flowing through it independent of the type of the material. As used herein, a mass flow sensor designed to determine mass flow of material independent of the type of material is referred to as a material independent mass flow sensor. In one embodiment, combine 102 is equipped with a material independent force mass flow sensor that is used to determine the mass of grain harvested by combine 102.

Figure 2:
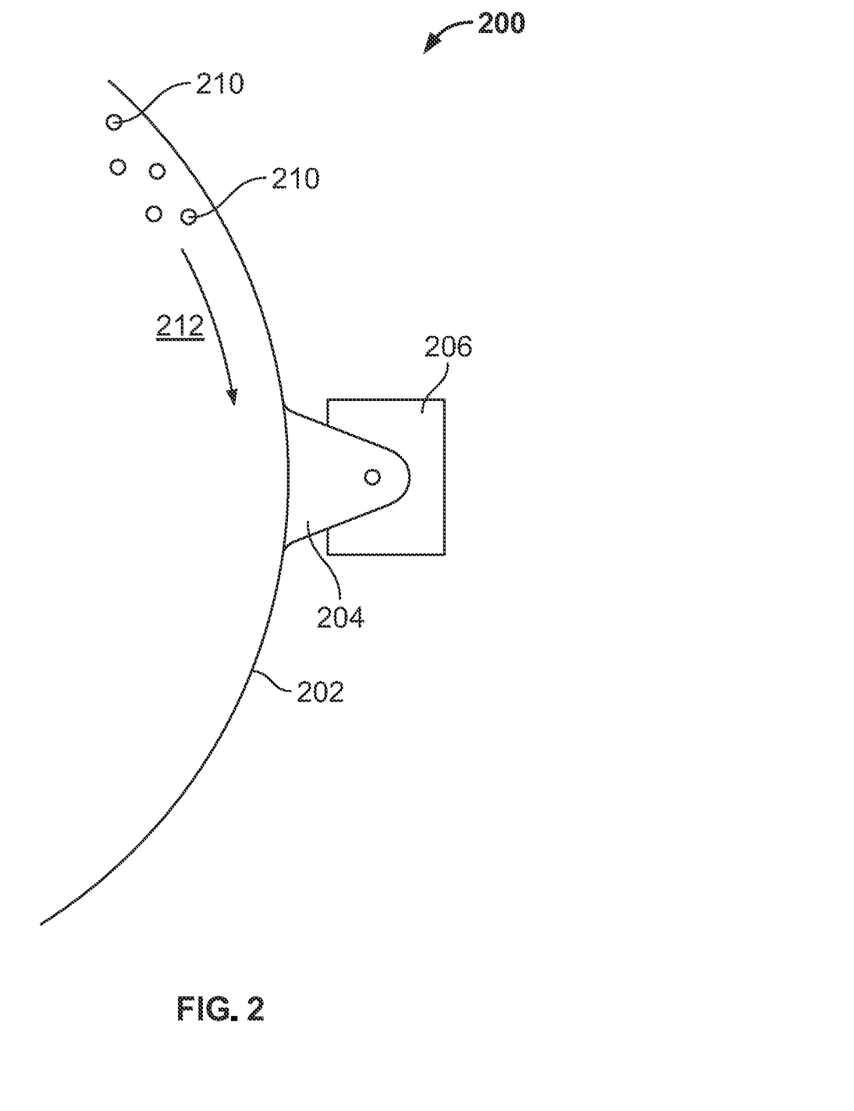
FIG. 2 shows a material independent mass flow sensor according to an embodiment.

FIG. 2 shows material independent mass flow sensor (MIMFS) 200 comprising a load curve 202. In one embodiment, load curve 202 is a curved plate made of stainless steel but can be made from other materials that are able to maintain their shape while in use as described herein. In one embodiment, the load curve has a constant radius. Force transfer fitting 204 is attached to load curve 202 and forces applied to load curve 202 are transferred to force transfer fitting 204. Three-measurement transducer 206 detects forces caused by material 210 (e.g., grain) contacting load curve 202. In one embodiment, the three-measurement transducer 206 measures a bend force $F_B$, a stretch force $F_S$ and a torque T. The bend force, $F_B$, is the vector component of the mass' net force on the load curve acting in the sensor's bend direction, which is parallel to the attachment point's angular location, β, with respect to machine-level. $F_B$ can be measured using load-location-independent transducer techniques such as differential bending beam, shear beam, etc. The stretch force, $F_S$, is the vector component of the mass' net force on the load curve acting in the sensor's stretch direction, which is perpendicular to the sensor's bend direction and tangent to the guide curve in the material's direction of motion. $F_S$ can be measured using load-location-independent transducer techniques such as differential bending beam, shear beam, etc. The torque, T, is the net moment generated by the bend and stretch forces and their respective distances from the sensor's zero-moment location. T can be measured using bending beam transducer techniques that depend on both force and distance. The measurements of the three forces are used to determine the mass of grain flowing through MIMFS 200.

Figure 3:
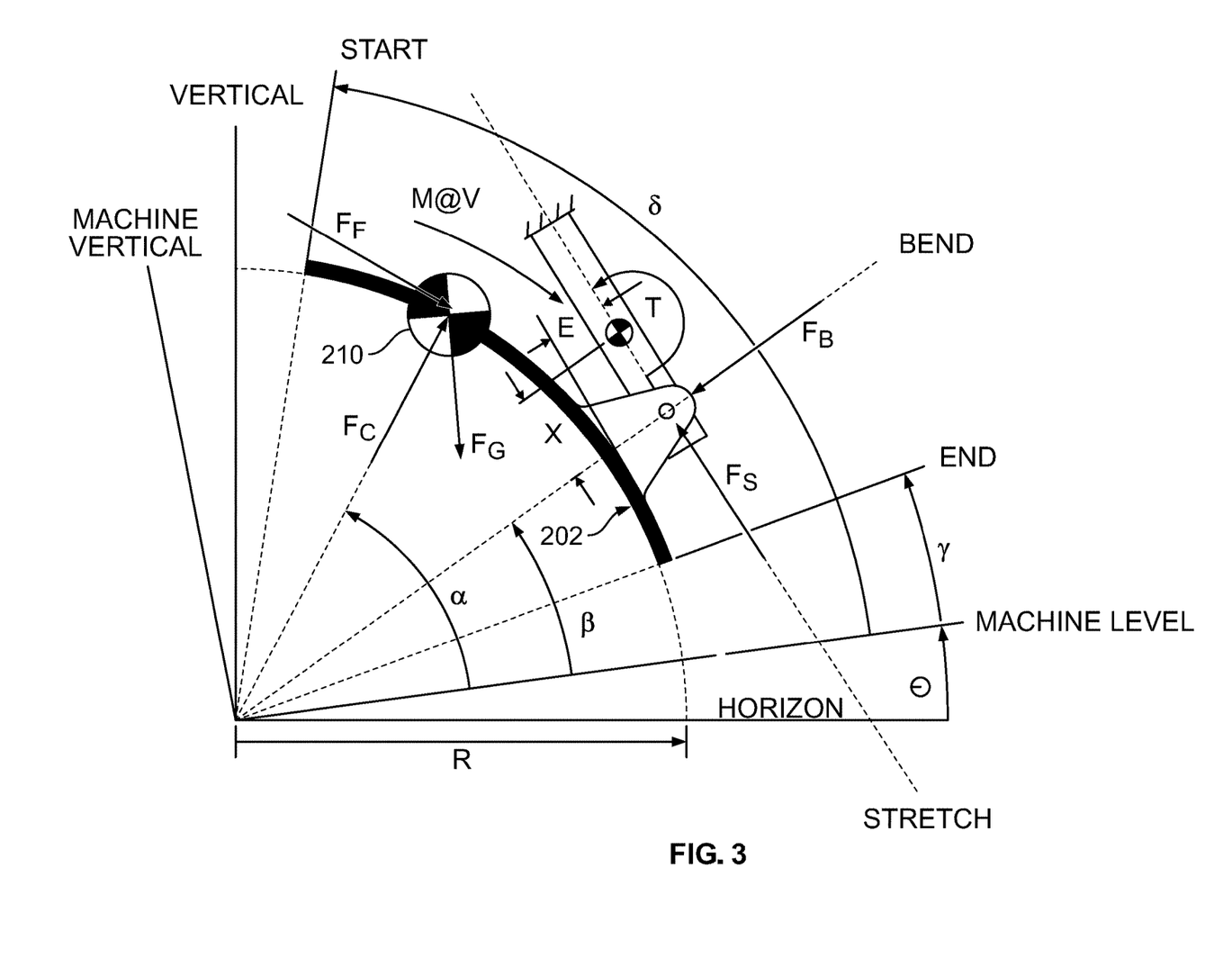
FIG. 3 shows a schematic of the forces associated with the material independent mass flow sensor.

FIG. 3 shows a schematic of the forces acting on grain 210 and the forces measured by MIMFS 200. Three forces (i.e., bend, stretch, and torque) are measured by the three-measurement transducer 206. $F_B$ is the bend force and is perpendicular to load curve 202 at the connection location. $F_S$ is the stretch force that is parallel to load curve 202 at the connection location. T is the moment caused by mass on load curve 202 about the transducer's zero-moment location and is referred to as the torque. The zero-moment location on the three-measurement sensor is where force vectors in either the bend direction or the stretch direction generate zero moment. These force vectors at locations not in line with the zero-moment location generate moments that are proportional to the magnitudes of the respective force vectors and their distance from the zero-moment location.

The forces acting on grain 210 are shown in FIG. 3 and can be calculated as follows. $F_C$ is calculated as follows:

$$F_C = \frac{mv^2}{R}$$

where
  $F_C$ is centripetal force;
  m is mass of material 210;
  v is the velocity of material 210; and
  R is radius of load curve 202.
  $F_F$ is calculated as follows.

$$F_F = \mu \frac{mv^2}{R}$$

where
  $F_F$ is friction force;
  μ is the coefficient of friction of the mass traversing along load curve 202;
  m is mass of material 210;
  v is velocity of material 210; and
  R is radius of load curve 202.
  $F_g$ is calculated as follows.

$$F_g = mg$$

where
  $F_g$ is force due to gravity;
  m is mass of material 210; and
  g is the acceleration due to gravity.

As shown in FIG. 3, machine vertical is perpendicular to machine level. It should be noted that, as shown in FIG. 3, machine vertical is not always the same as true vertical because machine level may not be equal to level. For example, when machine is traveling on a flat and level surface, machine level and true level are the same and, as such, machine vertical and true vertical are the same.

There are several parameters shown in FIG. 3 which are known. δ is the angular location of the load curve entrance (i.e., the location along load curve 202 where material, such as grain, initially impacts the load curve) with respect to machine-level. γ is the angular location of the load curve exit (i.e., the location along load curve 202 where material such as grain, no longer impacts the load curve) with respect to machine-level. β is the angular location of the load curve/transducer connection point with respect to machine level. It is defined as the angle between machine-level and the line-segment from the load curve's center of curvature to the load curve/transducer connection point 202. The angle β also defines the direction with respect to machine-level of the bend force, $F_B$, acting on the three-measurement sensor 206. R is the radius of load curve 202. E is the offset distance in the β direction from load curve 202 to transducer 206 connection location. X is the offset distance perpendicular to the β direction from the transducer connection point location to the transducer's zero-moment location. g is the acceleration due to gravity.

In one embodiment, two particular variables can be measured, assumed, or input based on data from other devices. $v_0$ is the initial velocity of the mass of grain 210 as it enters load curve 202 at angular location δ of the load curve entrance. $v_0$ can be estimated as it leaves the clean grain elevator and enters MIMFS using the equation $v_0=\omega r$, or where "ω" is the rotational speed of the elevator drive sprocket and "r" is the distance of the grain's center of mass from the axis of the elevator drive sprocket as it leaves the elevator paddle. "ω" can be read and adjusted in real time via combine communications. "r" can be manually set or read via combine communications and adjusted based on specific elevator geometry. θ is the angular offset of machine level from true level. θ is the combine's pitch angle, nose up/down, as it moves through the field during harvest. It can be read and adjusted in real time using any available angular measurement device (e.g. inclinometer, accelerometer, etc.) that is either part of and within the three-measurement sensor or via combine communications.

There are four unknown quantities that affect the force generated as material (e.g., grain 210) travels along the concave surface of load curve 202. α is the angular location of the mass along load curve 202 with respect to machine level. μ is the coefficient of friction of the mass travelling along load curve 202. v is the velocity of the mass of material as it travels along load curve 202. And m is the mass of material (e.g., grain 210) travelling along load curve 202.

Each unknown quantity can be represented by an equation. In one embodiment, four equations are used to solve for the four unknowns.

Figure 4:
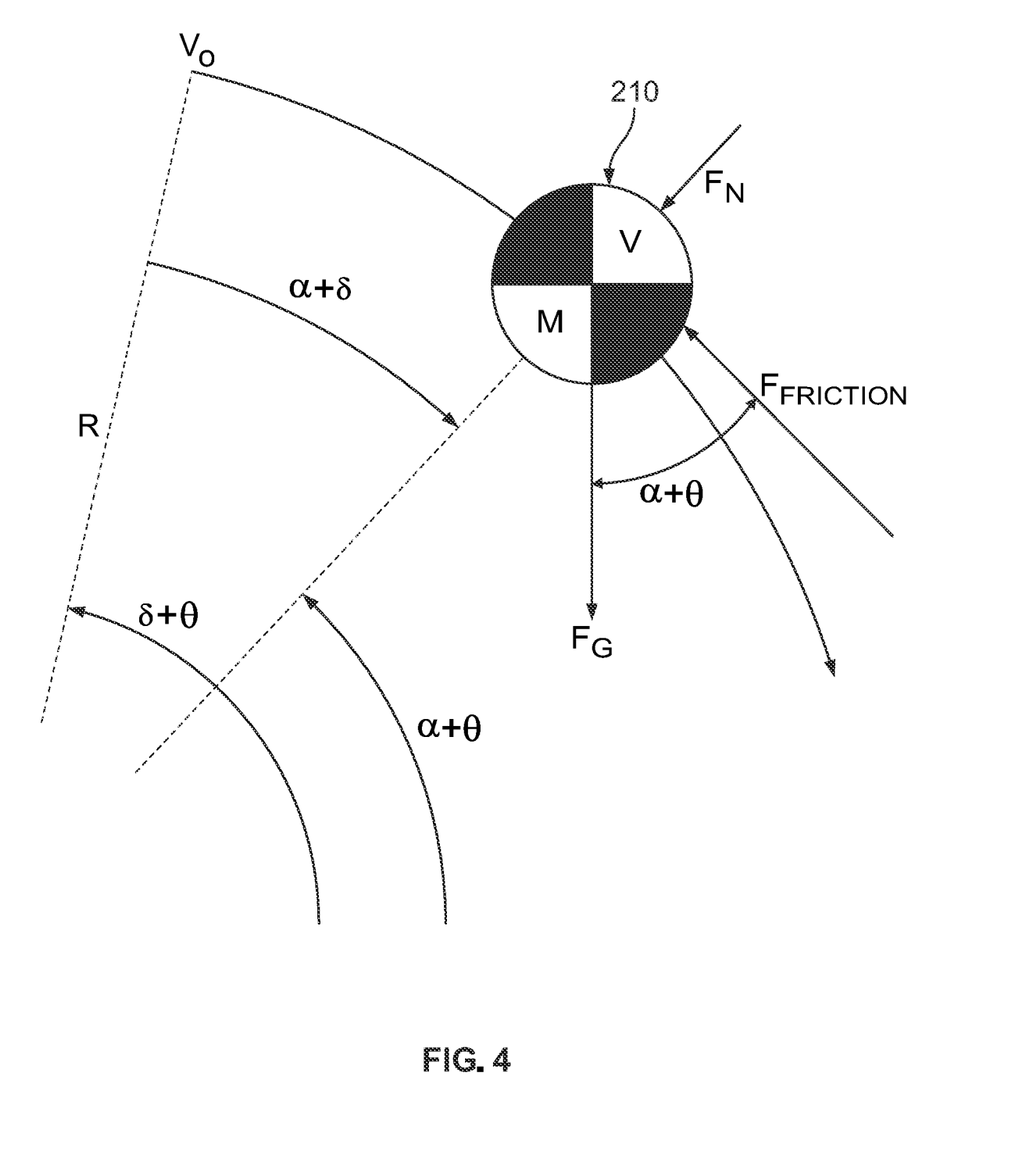
FIG. 4 shows details of the forces associated with the material independent mass flow sensor.

FIG. 4 shows details of the forces associated with the material independent mass flow sensor and, more particularly, the forces acting on material 210 (e.g., grain). The forces include $F_N$, normal to the load curve 202, and $F_{FRICTION}$, tangent to the load curve 202, which are caused by material 210 travelling along load curve 202.

$F_N$ is calculated using $$F_N = \frac{mv^2}{R} - mg\sin(\alpha + \theta)$$

where
m is mass of material 210;
v is velocity of material 210;
R is radius of load curve 202;
g is the acceleration due to gravity;
α is the center of mass of the object; and
θ is the angular offset of machine level form the horizon (i.e., true level).

$F_{FRICTION}$ is calculated using $$F_{FRICTION} = \mu\left(\frac{mv^2}{R} - mg\sin(\alpha + \theta)\right)$$

where
μ is the coefficient of friction;
m is mass of material 210;
v is velocity of material 210;
R is radius of load curve 202;
g is the acceleration due to gravity;
α is the center of mass of the object; and
θ is the angular offset of machine level form the horizon (i.e., true level).

The first equation relates potential energy, kinetic energy, and frictional work.

$$\alpha PE = \alpha KE - \Delta W_{FRICTION}$$

where
PE is potential energy;
KE is kinetic energy; and
$W_{FRICTION}$ is the work due to friction.

Replacing the delta terms with the parameters described above and the calculations above for $F_N$ and $F_{FRICTION}$ results in the equation:

$$mgR(\sin(\delta + \theta) - \sin(\alpha + \theta)) = \frac{1}{2}m(v^2 - v_0^2) - \mu\left(\frac{mv^2}{R} - mg\sin(\alpha + \theta)\right)R(\alpha - \delta)$$

where
m is mass of material 210;
g is the acceleration due to gravity;
δ is the angular location of the load curve entrance with respect to machine level;
θ is the angular offset of machine level form the horizon (i.e., true level);
v is the object's velocity;
$v_0$, is the initial velocity of the object as it enters the load curve at δ;
μ is the coefficient of friction;
α is the center of mass of the object; and
R is the radius of the load curve.

This equation is then manipulated to produce the equation:

$$2gR(\sin(\delta + \theta) - \sin(\alpha + \theta)) = v^2 - v_0^2 - 2\mu\left(\frac{v^2}{R} - g\sin(\alpha + \theta)\right)R(\alpha - \delta)$$

where
m is mass of material 210 and cancels out of the first equation;
g is the acceleration due to gravity;
R is the radius of the load curve;
δ is the angular location of the load curve entrance with respect to machine level;
θ is the angular offset of machine level form the horizon (i.e., true level);
α is the center of mass of the object;
v is the object's velocity;
$v_0$ is the initial velocity of the object as it enters the load curve at δ; and
μ is the coefficient of friction.

Figure 5:
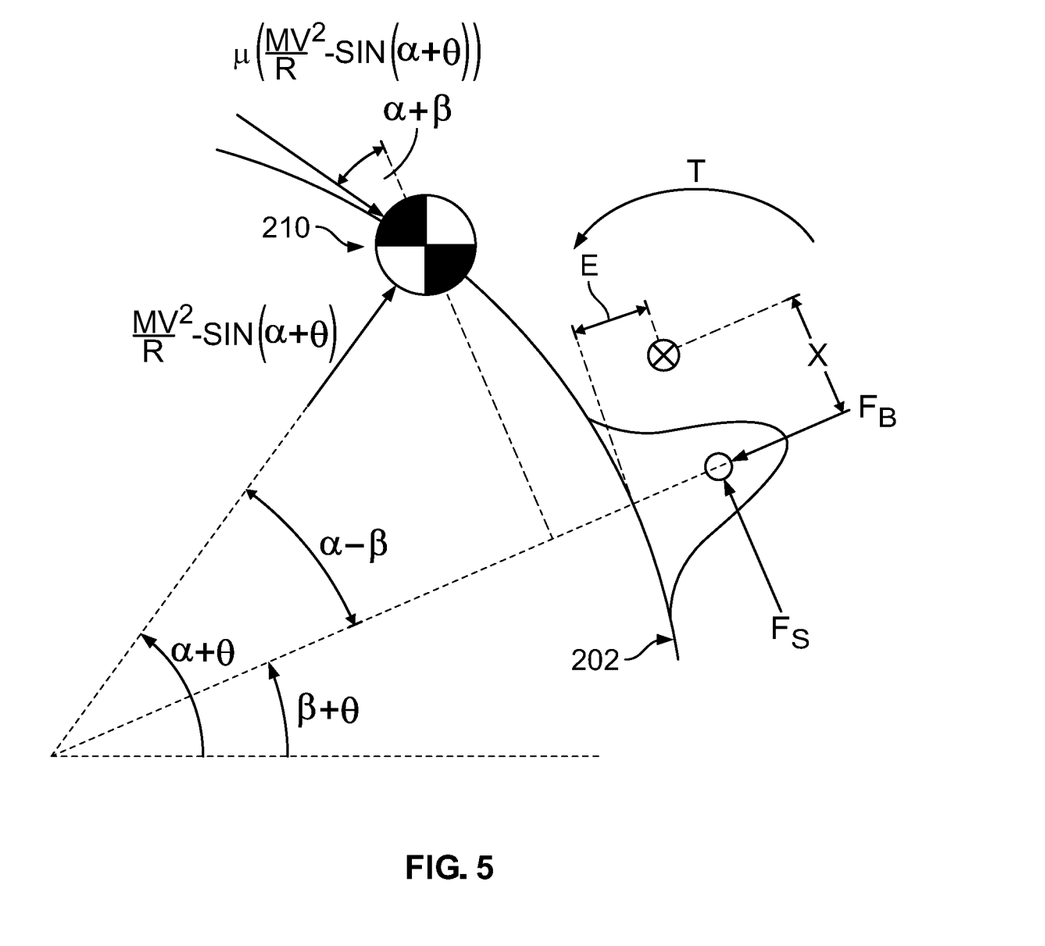
FIG. 5 shows details of additional forces associated with the material independent mass flow sensor.

FIG. 5 shows details of additional forces associated with the material independent mass flow sensor and, more particularly, additional forces acting on material 210 (e.g., grain).

A second equation is derived by summing the forces in the bend direction and setting them equal to zero.

$$\Sigma F_B = 0;$$

Solving the equation for bend force, $F_B$, yields:

$$F_B = \left(\frac{mv^2}{R} - mg\sin(\alpha + \theta)\right)\cos(\alpha - \beta) + \mu\left(\frac{mv^2}{R} - mg\sin(\alpha + \theta)\right)\sin(\alpha - \beta)$$

where
m is mass of material 210;
g is the acceleration due to gravity;
R is the radius of the load curve;

δ is the angular location of the load curve entrance with respect to machine level;
θ is the angular offset of machine level form the horizon (i.e., true level);
α is the center of mass of the object;
v is the object's velocity;
$v_0$ is the initial velocity of the object as it enters the load curve at δ;
β is the angular location of the load curve/transducer connection point with respect to machine level; and
μ is the coefficient of friction.

A third equation is derived by summing the forces in the stretch direction and setting them equal to zero.

$$\Sigma F_s = 0;$$

Solving the equation for stretch force, $F_S$, yields:

$$F_s = -\left(\frac{mv^2}{R} - mg\sin(\alpha + \theta)\right)\sin(\alpha - \beta) + \mu\left(\frac{mv^2}{R} - mg\sin(\alpha + \theta)\right)\cos(\alpha - \beta)$$

where:
m is mass of material 210;
g is the acceleration due to gravity;
R is the radius of the load curve;
δ is the angular location of the load curve entrance with respect to machine level;
θ is the angular offset of machine level form the horizon (i.e., true level);
α is the center of mass of the object;
v is the object's velocity;
$v_0$ is the initial velocity of the object as it enters the load curve at δ;
β is the angular location of the load curve/transducer connection point with respect to machine level; and
μ is the coefficient of friction.

A fourth equation sums the moments about the zero-moment location and sets the summed moments equal to zero.

$$\Sigma M = 0;$$

Solving the equation for Torque, T, yields:

$$T = \left(\frac{mv^2}{R} - mg\sin(\alpha + \theta)\right)\cos(\alpha - \beta)(R\sin(\alpha - \beta) - X) +$$

$$\left(\frac{mv^2}{R} - mg\sin(\alpha + \theta)\right)\sin(\alpha - \beta)(R - R\cos(\alpha - \beta) + E) +$$

$$\mu\left(\frac{mv^2}{R} - mg\sin(\alpha + \theta)\right)\sin(\alpha - \beta)(R\sin(\alpha - \beta) - X) -$$

$$\mu\left(\frac{mv^2}{R} - mg\sin(\alpha + \theta)\right)\cos(\alpha - \beta)(R - R\cos(\alpha - \beta) + E) + F_B^* X$$

where
m is mass of material 210;
g is the acceleration due to gravity;
R is the radius of the load curve;
δ is the angular location of the load curve entrance with respect to machine level;
θ is the angular offset of machine level form the horizon (i.e., true level);
α is the center of mass of the object;
v is the object's velocity;
$v_0$ is the initial velocity of the object as it enters the load curve at δ;
β is the angular location of the load curve/transducer connection point with respect to machine level;
X is the offset distance from the transducer connection location to the transducer's zero-moment location;
E is the offset distance from the load-curve to the transducer connection location; and
μ is the coefficient of friction.

Figure 6:
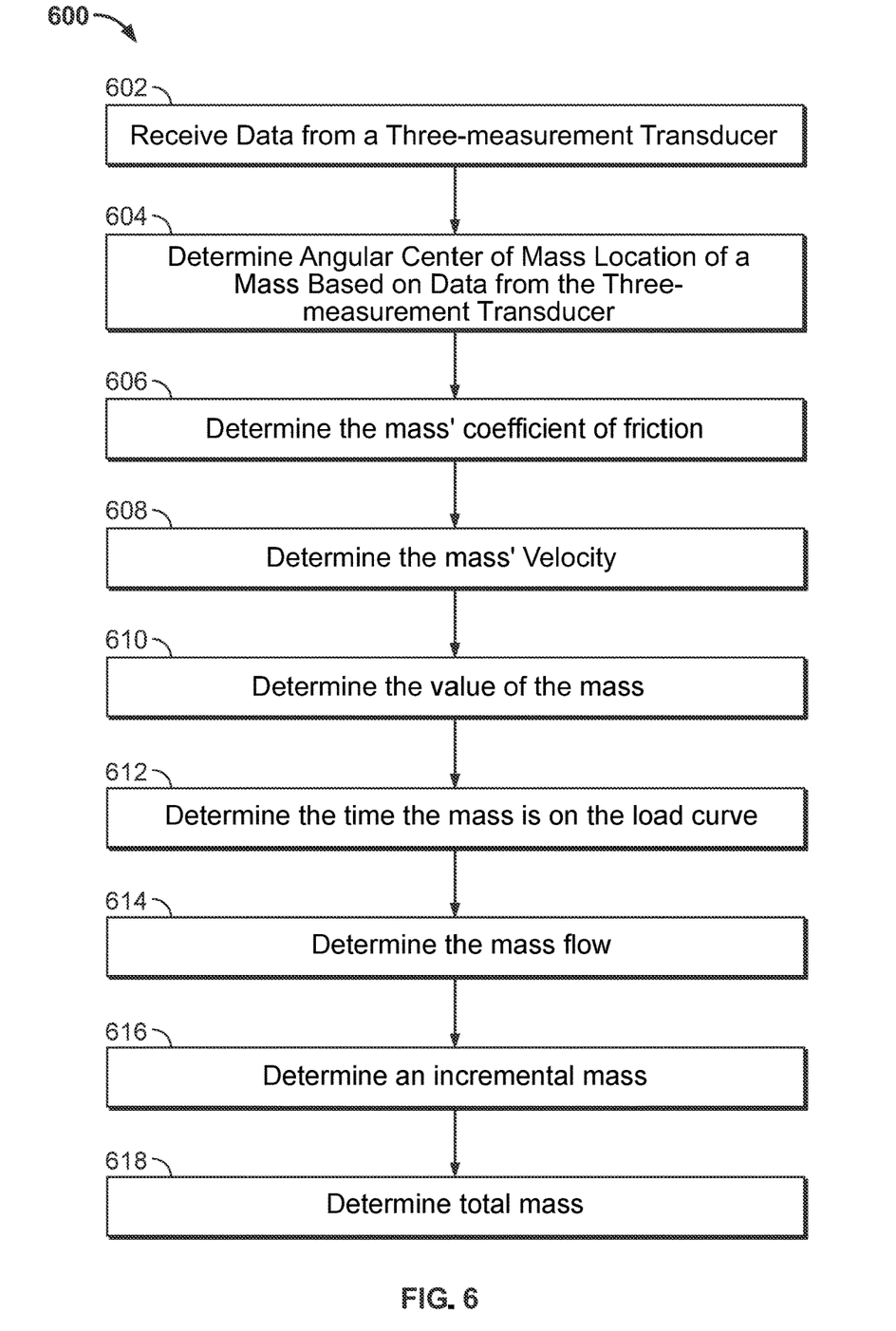
FIG. 6 depicts a flow chart of a method for determining mass.

FIG. 6 shows a flow chart of method 600 for determining a mass of material (e.g., an object such as grain) based on data from the material independent mass flow sensor according to an embodiment. At step 602, data pertaining to bend force, stretch force, and torque are received from three-measurement transducer 206. At step 604, an angular center of mass location α of the object along load curve 202 is determined based on the data from the three-measurement transducer. The forces are caused by the object travelling along load curve 202. In one embodiment, Angular center of mass location a is determined based on sensor measurements $F_B$, $F_S$, and T, load curve radius R, transducer attachment offset E and transducer attachment angular location with respect to machine-level β. In one embodiment, angular center of mass location α is determined using one of the solutions for a generated by solving the four aforementioned equations for α, μ, v and m:

$$\alpha 1 := \arctan\left\{\frac{-\sqrt{F_B^2\left(-E(E+2R)F_S^2 - 2T(E+R)F_S + F_B^2 R^2 - T^2\right)}F_S + F_B^2((E+R)F_S + T)}{(F_B^2 + F_S^2)F_B R}, \frac{\sqrt{F_B^2\left(-E(E+2R)F_S^2 - 2T(E+R)F_S + F_B^2 R^2 - T^2\right)} + (E+R)F_S^2 + F_S T}{(F_B^2 + F_S^2)R}\right\} + \beta$$

In one embodiment, In the case where load curve geometry causes forces in the bend direction to reverse, the second solution for α can be substituted, though specific design of the load curve will ensure this case is unnecessary.

$$\alpha 2 := \arctan\left\{\frac{\sqrt{F_B^2\left(-E(E+2R)F_S^2 - 2T(E+R)F_S + F_B^2 R^2 - T^2\right)}F_S + F_B^2((E+R)F_S + T)}{(F_B^2 + F_S^2)F_B R}, \frac{-\sqrt{F_B^2\left(-E(E+2R)F_S^2 - 2T(E+R)F_S + F_B^2 R^2 - T^2\right)} + (E+R)F_S^2 + F_S T}{(F_B^2 + F_S^2)R}\right\} + \beta$$

At step 606, the object's coefficient of friction, μ, is determined. In one embodiment, the object's coefficient of friction is calculated based on the angular center of mass location, α, as determined in step 604, $F_B$, $F_S$, and β. It should be noted that although calculating the object's coefficient of friction suggests knowledge of the material's friction dependent properties such as moisture, size, shape, etc., data pertaining to those properties are not required when using the method described herein. As such, the mass flow measurement is material independent. In one embodiment, the following equation is used to determine the object's coefficient of friction, μ.

$$\mu := \frac{F_B\sin(\alpha-\beta) + F_S\cos(\alpha-\beta)}{F_B\cos(\alpha-\beta) - F_S\sin(\alpha-\beta)}$$

At step 608, the object's velocity, v, is determined. In one embodiment, v is determined based on the angular center of mass location, a, as determined in step 604, the object's coefficient of friction, μ, as determined in step 606, the load curve 202 radius of curvature R, the gravitational acceleration g, the angular location of load curve 202 entrance with respect to machine level δ, and the initial velocity of the mass as it enters load curve 202 at "δ" is $v_0$. It should be noted that the object's initial velocity can be assumed, or input based on clean-grain-elevator parameters. $v_0$ can be estimated as it leaves the clean grain elevator and enters MIMFS using the equation $v_0$, ωr, where "ω" is the rotational speed of the elevator drive sprocket and "r" is the distance of the grain's center of mass from the axis of the elevator drive sprocket as it leaves the elevator paddle. "CO" can be read and adjusted in real time via combine communications. "r" can be manually set or read via combine communications and adjusted based on specific elevator geometry. Angular offset θ can be measured directly or input from other devices in the system. It should not be assumed equal to zero as minimal differences in the velocity calculation may generate significant differences of several percent in the subsequent mass calculation. In one embodiment, the following equation is used to determine v.

$$v := \sqrt{\frac{2\sin(\alpha+\theta)R\alpha g\mu - 2\sin(\alpha+\theta)R\delta g\mu - 2gR\sin(\delta+\theta) + 2g\sin(\alpha+\theta)R - v_0^2}{2\alpha\mu - 2\delta\mu - 1}}$$

At step 610, the mass m of the object is determined. In one embodiment, mass m is determined based on the angular center of mass location, α, as determined in step 604, the object's coefficient of friction, μ, as determined in step 606, the object's velocity v calculated in step 608, measured bend force $F_B$, the load curve 202 radius of curvature R, transducer attachment angular location with respect to machine level β, gravitational acceleration g, and the angular offset of machine level from true level θ. In one embodiment, the following equation is used to determine mass m.

$$m := -\frac{F_B R}{\sin(\alpha+\theta)\sin(\alpha-\beta)Rg\mu + \sin(\alpha+\theta)\cos(\alpha-\beta)Rg - \sin(\alpha-\beta)\mu v^2 - \cos(\alpha-\beta)v^2}$$

It should be noted that, in order for the solution to be valid, the difference between centripetal acceleration ($v^2$/R) and the centripetal component of gravity (g*sin(α+θ)) must be non-negative. Otherwise, the object will fall away from load curve 202.

At step 612, a measurement time, specifically, the time a mass is located on the load curve, is determined. In one embodiment, measurement time is determined based on the average of the estimated initial velocity at the angular location of the load curve entrance δ and the calculated final velocity using the equation of step 608 with the value of the angular location of center of mass a set to the angular location of the load curve exit γ. In one embodiment, measurement time is further based on the angular location of the load curve entrance with respect to machine level δ, the angular location of the load curve exit with respect to machine level γ and the load curve radius R. In one embodiment, a measurement time is based on the following equation:

$$t_m = (\delta-\gamma)R/\{(v_0-v_f)/2\} \text{ where}$$

$t_m$ is the measurement time;
δ is the angular location of the load curve entrance with respect to machine level;
γ is the angular location of the load curve exit with respect to machine level;
R is the load curve radius;
$v_0$ is the estimated initial velocity, ω r, at the load curve entrance δ; and
$v_f$ is the calculated final velocity at the load curve exit γ.

In one embodiment, initial and/or final velocities are measured with optical sensors and utilized in the preceding calculations.

At step 614, a mass flow is determined. In one embodiment, a mass flow is determined based on a mass of an object and a measurement time. In one embodiment, the following equation is used to calculate mass flow:

$$dm/dt = m/t_m \text{ where}$$

dm/dt=mass flow;
m is mass determined in step 610; and
$t_m$ is measurement time determined in step 612.

At step 616, an incremental mass is determined. In one embodiment, an incremental mass is determined based on a mass of an object, the three-measurement transducer's measurement sampling rate and the measurement time. In one embodiment, an incremental mass is determined using the following equation:

$$m_i = m/(r_m * t_m) \text{ where}$$

$m_i$ is the incremental mass;
m is the mass determined in step 610;
$r_m$ is the three-measurement transducer's measurement sampling rate; and
$t_m$ is the measurement tm determined in step 612.

At step 618, a total mass is determined. In one embodiment, a total mass is determined by summing incremental masses from step 616 over the duration of the process. In one embodiment, total mass is determined using the following equation:

$$M = \Sigma m_i \text{ where}$$

M is the total mass; and
$m_i$ is the incremental mass.

Figure 7:
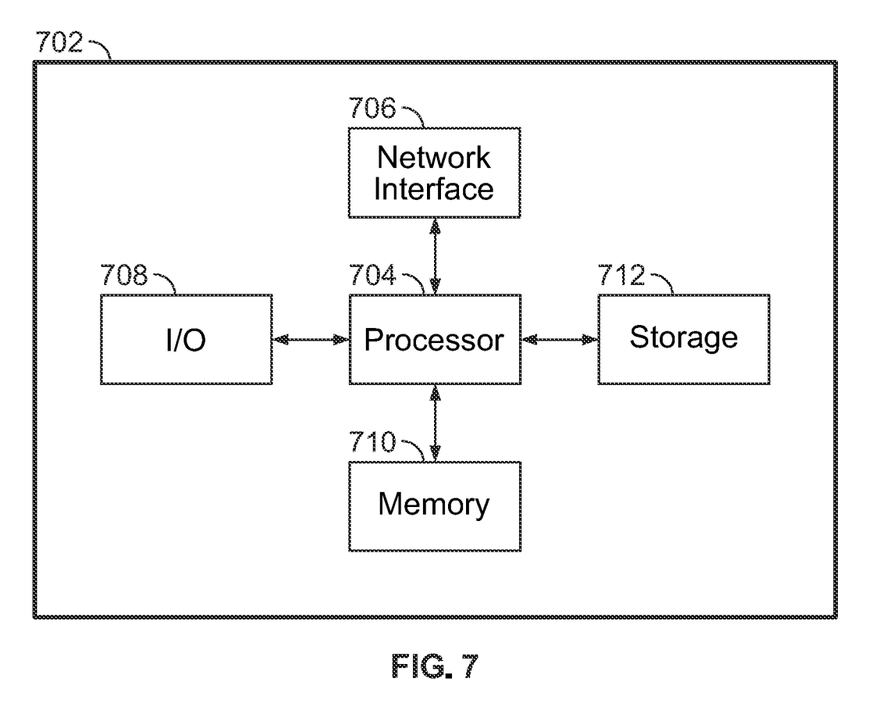
FIG. 7 shows a high-level schematic of a computer for receiving data, calculating forces, determining mass flow, performing methods, and calculating the result of equations as described herein.

FIG. 7 depicts a high-level schematic of a computer for receiving data from the three-measurement sensor, calculating forces, determining mass flow, and performing calculations to determine the results of equations described herein.

In one embodiment, a computer is used for receiving data from the three-measurement sensor, calculating forces, determining mass flow, and performing calculations to determine the results of equations described herein. A high-level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the methods and equations described herein can be defined by the computer program instructions stored in the memory 710 and/or storage 712 and controlled by the processor 704 executing the computer program instructions. For example, the computer program instructions can be implemented as computer executable code programmed by one skilled in the art to perform an algorithm defined by the methods and equations described herein such as the method shown in FIG. 6. Accordingly, by executing the computer program instructions, the processor 704 executes an algorithm defined by the methods and equations described herein such as the method shown in FIG. 6. The computer 702 also includes one or more network interfaces 706 for communicating with other devices via a network. The computer 702 also includes input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high-level representation of some of the components of such a computer for illustrative purposes.

The foregoing Detailed Description is to be understood as being in every respect illustrative and exemplary, but not restrictive, and the scope of the inventive concept disclosed herein should be interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for determining mass of an object moving through a material independent mass flow sensor (MIMFS), the method comprising:
   receiving data from a three-measurement transducer attached to a load curve as the object moves through the MIMFS;
   determining an angular center of mass location of the object along the load curve based on the data from the three-measurement transducer;
   determining a coefficient of friction of the object;
   determining a velocity of the object; and
   determining a mass of the object based on the angular center of mass location of the object, the coefficient of friction of the object, and the velocity of the object.

2. The method of claim 1, wherein the data received from the three-measurement transducer comprises bend force data $F_B$, stretch force data $F_S$, and torque data T.

3. The method of claim 2, wherein determining the angular center of mass location of the object is further based on $F_B$, $F_S$, T, load curve radius R, transducer attachment offset E and transducer attachment angular location with respect to machine level $\beta$.

4. The method of claim 3, wherein, for positive values of bend force $F_B$, the angular center of mass location of the object is calculated using the formula $$\alpha 1 := \arctan\left\{\frac{-\frac{\sqrt{F_B^2(-E(E+2R)F_S^2 - 2T(E+R)F_S + F_B^2 R^2 - T^2)}F_S + F_B^2((E+R)F_S + T)}{(F_B^2 + F_S^2)F_B R}, \frac{\sqrt{F_B^2(-E(E+2R)F_S^2 - 2T(E+R)F_S + F_B^2 R^2 - T^2)} + (E+R)F_S^2 + F_S T}{(F_B^2 + F_S^2)R}\right\} + \beta$$

5. The method of claim 3, wherein, for negative values of bend force $F_B$, the angular center of mass location of the object is calculated using the formula $$\alpha 2 := \arctan\left\{\frac{\frac{\sqrt{F_B^2(-E(E+2R)F_S^2 - 2T(E+R)F_S + F_B^2 R^2 - T^2)}F_S + F_B^2((E+R)F_S + T)}{(F_B^2 + F_S^2)F_B R}, \frac{-\sqrt{F_B^2(-E(E+2R)F_S^2 - 2T(E+R)F_S + F_B^2 R^2 - T^2)} + (E+R)F_S^2 + F_S T}{(F_B^2 + F_S^2)R}\right\} + \beta$$

6. The method of claim 2, wherein determining the coefficient of friction of the object is based on the angular center of mass location $\alpha$, $F_B$, $F_S$, and $\beta$.

7. The method of claim 6, wherein the coefficient of friction of the object is calculated using the formula $$\mu := \frac{F_B \sin(\alpha - \beta) + F_S \cos(\alpha - \beta)}{F_B \cos(\alpha - \beta) - F_S \sin(\alpha - \beta)}.$$

8. The method of claim 2, wherein determining the velocity of the object is based on the angular center of mass location of the object $\alpha$, the coefficient of friction of the object $\mu$, radius of the load curve R, gravitational acceleration g, angular location of a load entrance of the load curve with respect to machine level $\delta$, the angular offset of machine level from true level $\theta$, and an initial velocity of the object as it enters the load curve at location $\delta$ is $v_0$.

9. The method of claim 8, wherein the velocity of the object is calculated using the formula $$v := \sqrt{\frac{2\sin(\alpha + \theta)R\alpha g\mu - 2\sin(\alpha + \theta)R\delta g\mu - 2gR\sin(\delta + \theta) + 2g\sin(\alpha + \theta)R - v_0^2}{2\alpha\mu - 2\delta\mu - 1}}.$$

10. The method of claim 2, wherein determining a mass of the object is further based on the three-measurement transducer's measured bend force $F_B$, a radius of a load curve attached to the three-measurement transducer R, the angular location of transducer attachment with respect to machine level $\beta$, gravitational acceleration g, the calculated velocity v, and an angular offset of machine level from true level $\theta$.

11. The method of claim 10, wherein the mass of the object is calculated using the formula $$m := -\frac{F_B R}{\sin(\alpha + \theta)\sin(\alpha - \beta)Rg\mu + \sin(\alpha + \theta)\cos(\alpha - \beta)Rg - \sin(\alpha - \beta)\mu v^2 - \cos(\alpha - \beta)v^2}$$

12. The method of claim 1, further comprising:
   determining a measurement time based on a time the mass is located on the load curve;
   determining a mass flow based on the mass and the measurement time;
   determining an incremental mass based on the mass and the measurement sampling rate; and
   determining a total mass by summing incremental masses.

13. A material independent mass flow sensor (MIMFS) comprising:
- a load curve configured to guide an object received at one end of the load curve to an opposite end of the load curve;
- a three-measurement transducer attached to the load curve for measuring bend force $F_B$, stretch force $F_S$, and torque T;
- a processor; and
- a memory storing computer program instructions, the computer program instructions, when executed on the processor, cause the processor to perform operations comprising:
- determining an angular center of mass location of the object along the load curve based on data received from the three-measurement transducer;
- determining a coefficient of friction of the object;
- determining a velocity of the object; and
- determining a mass of the object based on the angular center of mass location of the mass, the coefficient of friction of the mass, and the velocity of the mass.

14. The material independent mass flow sensor of claim 13, wherein the data received from the three-measurement transducer comprises bend force data $F_B$, stretch force data $F_S$, and torque data T.

15. The material independent mass flow sensor of claim 14, wherein determining the angular center of mass location of the object is further based on $F_B$, $F_S$, T, load curve radius R, transducer attachment offset E and transducer attachment angular location with respect to machine level $\beta$.

16. A combine for harvesting material from a field, the combine having a material independent mass flow sensor (MIMFS), the sensor comprising:
- a load curve configured to guide an object received at one end of the load curve to an opposite end of the load curve;
- a three-measurement transducer attached to the load curve for measuring bend force $F_B$, stretch force $F_S$, and torque T;
- a processor; and
- a memory storing computer program instructions, the computer program instructions, when executed on the processor, cause the processor to perform operations comprising:
- determining an angular center of mass location of the object along the load curve based on data received from the three-measurement transducer;
- determining a coefficient of friction of the object;
- determining a velocity of the object; and
- determining a mass of the object based on the angular center of mass location of the mass, the coefficient of friction of the mass, and the velocity of the mass.

17. The combine of claim 16, wherein the data received from the three-measurement transducer comprises bend force data $F_B$, stretch force data $F_S$, and torque data T.

18. The combine of claim 17, wherein the determining the angular center of mass location of the object is further based on $F_B$, $F_S$, T, load curve radius R, transducer attachment offset E and transducer attachment angular location with respect to machine level $\beta$.

19. The material independent mass flow sensor of claim 14, wherein determining a mass of the object is further based on the angular location of the entrance to the load curve with respect to machine level the angular offset of machine level from true level $\theta$, the initial velocity of the mass entering the load curve $v_0$, and the gravitational acceleration g.

20. The combine of claim 19, wherein the mass of the object is calculated using the formula $$m := -\frac{F_B R}{\sin(\alpha+\theta)\sin(\alpha-\beta)Rg\mu + \sin(\alpha+\theta)\cos(\alpha-\beta)Rg - \sin(\alpha-\beta)\mu v^2 - \cos(\alpha-\beta)v^2}$$

* * * * *